(12) United States Patent
Oota et al.

(10) Patent No.: US 12,257,745 B2
(45) Date of Patent: Mar. 25, 2025

(54) SHEET MOLDING COMPOUND AND FIBER-REINFORCED COMPOSITE

(71) Applicant: Mitsubishi Chemical Corporation, Tokyo (JP)

(72) Inventors: Akira Oota, Tokyo (JP); Hayato Ogasawara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1025 days.

(21) Appl. No.: 17/192,103

(22) Filed: Mar. 4, 2021

(65) Prior Publication Data

US 2021/0221969 A1    Jul. 22, 2021

Related U.S. Application Data

(63) Continuation of application No. PCT/JP2019/034369, filed on Sep. 2, 2019.

(30) Foreign Application Priority Data

Sep. 5, 2018 (JP) ................................. 2018-165832

(51) Int. Cl.
| | |
|---|---|
| *B29C 43/00* | (2006.01) |
| *B29C 43/02* | (2006.01) |
| *B29C 70/10* | (2006.01) |
| *C08J 5/24* | (2006.01) |
| *B29K 63/00* | (2006.01) |
| *B29K 105/00* | (2006.01) |
| *B29K 105/08* | (2006.01) |
| *B29K 307/04* | (2006.01) |

(52) U.S. Cl.
CPC .......... *B29C 43/003* (2013.01); *B29C 43/021* (2013.01); *B29C 70/10* (2013.01); *C08J 5/24* (2013.01); *B29K 2063/00* (2013.01); *B29K 2105/0872* (2013.01); *B29K 2105/251* (2013.01); *B29K 2307/04* (2013.01); *C08J 2363/00* (2013.01)

(58) Field of Classification Search
CPC ..... B29C 43/003; B29C 43/021; B29C 70/10; C08J 5/24; C08J 2363/00; B29K 2063/00; B29K 2105/0872; B29K 2105/251; B29K 2307/04
USPC ....................................................... 523/468
See application file for complete search history.

(56) References Cited

U.S. PATENT DOCUMENTS

| | | | |
|---|---|---|---|
| 5,084,532 A | 1/1992 | Schenkel | |
| 2014/0288214 A1 | 9/2014 | Oka et al. | |
| 2015/0148451 A1 | 5/2015 | Harada et al. | |
| 2016/0369042 A1 | 12/2016 | Nii et al. | |
| 2017/0037201 A1 | 2/2017 | Asai et al. | |
| 2017/0166687 A1* | 6/2017 | Ortelt ................... C08G 59/506 |
| 2018/0142057 A1* | 5/2018 | Oota ....................... C08L 51/00 |

FOREIGN PATENT DOCUMENTS

| | | |
|---|---|---|
| CN | 103917574 A | 7/2014 |
| CN | 104379629 A | 2/2015 |
| CN | 106232692 A | 12/2016 |
| EP | 0458502 A2 | 11/1991 |
| EP | 2774939 A1 | 9/2014 |
| EP | 3133108 A1 | 2/2017 |
| EP | 3425005 A1 | 1/2019 |
| EP | 3611210 A1 | 2/2020 |
| EP | 3632982 A1 | 4/2020 |
| JP | 58191723 A | 11/1983 |
| JP | S6178841 A | 4/1986 |
| JP | 2-88684 A | 3/1990 |
| JP | 2-88685 A | 3/1990 |
| JP | 02-286722 A | 11/1990 |
| JP | 04-88011 A | 3/1992 |
| JP | 11-302507 A | 11/1999 |
| JP | 2000309626 A | 11/2000 |
| JP | 2001354788 A | 12/2001 |
| JP | 2002012649 A | 1/2002 |
| JP | 2002145986 A | 5/2002 |
| JP | 2004043769 A | 2/2004 |
| JP | 2004189811 A | 7/2004 |

(Continued)

OTHER PUBLICATIONS

ThermoFisher Scientific, "Safety Data Sheet: Dicyandiamide", Mar. 29, 2024. (Year: 2024).*
ThermoFisher Scientific, "Safety Data Sheet: 4,4'-diaminodiphenyl sulfone", Mar. 28, 2024. (Year: 2024).*

(Continued)

*Primary Examiner* — David T Karst

(74) *Attorney, Agent, or Firm* — Element IP, PLC

(57) ABSTRACT

Provided is a sheet molding compound which can inhibit the formation of burrs during press molding, enables a matrix resin to exhibit excellent fluidity and excellent quick curing properties during press molding, and makes it possible to obtain a fiber-reinforced composite excellent in mold release properties, mechanical characteristics, and heat resistance. The sheet molding compound of the present invention contains an epoxy resin composition and reinforcing fiber, in which a gel time of the epoxy resin composition is 30 to 140 seconds at 140° C., a temperature at the start of curing reaction of the epoxy resin composition is 70° C. to 115° C., and when b1 represents a viscosity of the epoxy resin composition measured at 30° C. 7 days after the preparation of the composition, and b2 represents a viscosity of the epoxy resin composition measured at 30° C. 14 days after the preparation of the composition, b1 and b2 satisfy b2/b1≤5.

9 Claims, No Drawings

(56) References Cited

FOREIGN PATENT DOCUMENTS

| JP | 2014185256 A | | 10/2014 | |
|---|---|---|---|---|
| WO | WO-2008077836 A2 | | 7/2008 | |
| WO | WO-2015001764 A1 | | 1/2015 | |
| WO | WO-2016182077 A1 | * | 11/2016 | ............ C08G 59/24 |
| WO | WO-2017033632 A1 | * | 3/2017 | |
| WO | WO-2017150521 A1 | | 9/2017 | |
| WO | WO-2018190329 A1 | | 10/2018 | |

OTHER PUBLICATIONS

ThermoFisher Scientific, "Safety Data Sheet: 4,4'-diaminodiphenylmethane", Apr. 2, 2024. (Year: 2024).*

Kobayashi et al., WO 2017/033632 A1 machine translation in English, Mar. 2, 2017. (Year: 2017).*

International Search Report issued Nov. 26, 2019 in PCT/JP2019/034369 (with English translation), 4 pages.

Masaki Shimbo, Epoxy Resin Handbook, Nikkan Kogyo Shimbun, First Edition, Dec. 25, 1987(Showa 62), p. 154-157 (with partial English translation).

Office Action issued Oct. 27, 2020 in Japanese Patent Application No. 2019-550865 (with English translation), 10 pages.

Combined Chinese Office Action and Search Report issued Nov. 30, 2022 in Patent Application No. 201980057890.0 (with English translation), 18 pages.

Office Action issued Jul. 1, 2022 in European Patent Application No. 19856811.5, 4 pages.

CN-103917574A, US 2014/0288214 A1.

CN-104379629A, US 2015/0148451 A1.

CN-106232692A, US 2017/0037201 A1.

Office Action issued Jun. 23, 2023 in Chinese Patent Application No. 201980057890.0 (with English translation), 10 pages.

Extended European Search Report issued Aug. 23, 2021 in Patent Application No. 19856811.5, 8 pages.

* cited by examiner

SHEET MOLDING COMPOUND AND FIBER-REINFORCED COMPOSITE

This application is a continuation application of International Application No. PCT/JP2019/034369, filed on Sep. 2, 2019, which claims the benefit of priority of the prior Japanese Patent Application No. 2018-165832, filed on Sep. 5, 2018 in Japan, the content of which are incorporated herein by reference.

TECHNICAL FIELD

The present invention relates to a sheet molding compound and a fiber-reinforced composite.

BACKGROUND ART

Owing to its excellent mechanical characteristics and the like, a fiber-reinforced composite formed of reinforcing fiber including carbon fiber and a matrix resin is widely used for airplanes, automobiles, and industrial uses. In recent years, as the use of the fiber-reinforced composite has increased, the scope of application thereof has also widened.

A matrix resin as the fiber-reinforced composite needs to express high mechanical characteristics even in a high-temperature environment. Furthermore, a matrix resin of a molding material (sheet molding compound (hereinafter, described as SMC as well), prepreg, or the like) used for manufacturing the fiber-reinforced composite needs to have excellent molding properties.

As a matrix resin of a molding material, a resin composition containing a thermosetting resin, with which reinforcing fiber is excellently impregnated and which expresses excellent heat resistance after curing, is frequently used. As the thermosetting resin, a phenol resin, a melamine resin, a bismaleimide resin, an unsaturated polyester resin, an epoxy resin, and the like are used.

Among these, the epoxy resin composition is suitable as a matrix resin because this resin has excellent molding properties, expresses excellent heat resistance after curing, and enables a fiber-reinforced composite prepared using the epoxy resin composition to exhibit high mechanical characteristics.

The method for manufacturing a fiber-reinforced composite by molding a molding material includes an autoclave molding method, a filament winding molding method, a resin injection molding method, a vacuum resin injection molding method, a press molding method, and the like. Among these, the press molding method is in an increasing demand because this method has high productivity and makes it easy to obtain a fiber-reinforced composite excellent in terms of design.

As a molding material used in the press molding method, SMC constituted with reinforcing short fiber and a matrix resin is being actively used, because this material makes it possible to manufacture a fiber-reinforced composite having a complicated shape and produces a fiber-reinforced composite optimal for a structural member.

For the matrix resin used in SMC, the following characteristics are required.

In order to secure for carbon fiber to be impregnated with the matrix resin during the manufacturing SMC, the matrix resin of SMC needs to have an extremely low viscosity during the manufacturing SMC.

In order to secure handleability of SMC during press molding, the matrix resin of SMC needs to be in a B-stage (a state where the matrix resin is thickened by semi-curing and can be fluidized by heating) by being appropriately thickened and to have appropriate tackiness (pressure sensitive adhesiveness) and draping properties (flexibility).

In order to secure fluidity of the matrix resin during press molding, the matrix resin of SMC needs to be maintained in the B-stage for a long period of time (B-stage stability).

In order to mold SMC within a short period of time at a high temperature by the press molding method, the matrix resin of SMC needs to be cured within a short period of time and have high heat resistance after curing.

In order to shorten the time required for a demolding or deburring operation after press molding as much as possible, the amount of burrs formed after the molding of the matrix resin of SMC needs to be small, and SMC needs to exhibit the same or higher rigidity against the mold temperature.

In order to obtain a carbon fiber-reinforced composite having high mechanical characteristics and high heat resistance, SMC needs to be able to exhibit high mechanical characteristics and high heat resistance after the curing of the matrix resin of SMC.

Although the epoxy resin composition forms a cured product having excellent mechanical characteristics and heat resistance, it is difficult for the epoxy resin composition to satisfy both the quick curing properties and B-stage stability.

That is, a curing agent curing the epoxy resin within a short period of time makes the curing reaction rapidly proceed at room temperature, the epoxy resin composition cannot be maintained in a B-stage for a long period of time. In contrast, with a curing agent that can maintain the epoxy resin composition in a B-stage for a long period of time, it is difficult to cure the epoxy resin within a short period of time.

Therefore, as the matrix resin of SMC, generally, a thermosetting resin composition obtained by diluting an unsaturated polyester resin or a vinyl ester resin with styrene is used. However, the thermosetting resin composition containing the unsaturated polyester resin or the vinyl ester resin causes serious cure shrinkage. Furthermore, a molded product obtained from this composition contains large amounts of volatile organic compounds. Therefore, the matrix resin needs to be epoxidized. Compared to the thermosetting resin composition obtained by diluting the unsaturated polyester resin or the vinyl ester resin with styrene, the epoxy resin composition causes less cure shrinkage. In addition, a molded product obtained from the epoxy resin composition contains only traces of volatile organic compounds.

As the epoxy resin composition used in SMC, the following compositions are suggested.

(1) Resin composition containing a hydroxyl group-containing epoxy resin, polyol, and a polyisocyanate compound (Patent Literature 1).

(2) Resin composition containing an epoxy resin, polyol, a polyisocyanate compound, dicyandiamide, and a specific imidazole compound (Patent Literature 2).

(3) Resin composition containing an epoxy resin, an aminoalkylimidazole compound, and a diazabicycloalkylene compound (Patent Literature 3).

As epoxy resin compositions used in adhesives, the following compositions are suggested.

(4) Liquid adhesive containing an epoxy resin, a curing agent activated at a temperature of 20° C. to 100° C., and a curing agent activated at a temperature of 100° C. to 200° C. (Patent Literature 4).

(5) Reactive hot melt adhesive containing an epoxy resin staying in a solid state at room temperature, an epoxy resin staying in a liquid state at room temperature, amino group-terminated linear polyoxypropylene, and a latent curing agent (dicyandiamide) (Patent Literature 5).

As epoxy resin compositions used in prepreg, the following compositions are suggested.

(6) Resin composition for impregnation containing an epoxy resin, a latent curing agent, a resin having a polymerizable unsaturated group, and a polymerization initiator (Patent Literature 6).

(7) Epoxy resin composition containing an epoxy resin, an acid anhydride, and a Lewis acid salt (boron trichloride amine complex) (Patent Literature 7 to 9).

As an epoxy resin composition capable of stably being B-staged, the following composition is suggested.

(8) Resin composition containing an epoxy resin and 2,5-dimethyl-2,5-hexamethylenediamine as a curing agent and mencenediamine (Non Patent Literature 1).

CITATION LIST

Patent Literature

[Patent Literature 1]
Japanese Unexamined Patent Application, First Publication No. S58-191723
[Patent Literature 2]
Japanese Unexamined Patent Application, First Publication No. H04-88011
[Patent Literature 3]
PCT International Publication No. WO 2008/77836
[Patent Literature 4]
Japanese Unexamined Patent Application, First Publication No. H02-88684
[Patent Literature 5]
Japanese Unexamined Patent Application, First Publication No. H02-88685
[Patent Literature 6]
Japanese Unexamined Patent Application, First Publication No. H02-286722
[Patent Literature 7]
Japanese Unexamined Patent Application, First Publication No. 2004-189811
[Patent Literature 8]
Japanese Unexamined Patent Application, First Publication No. 2004-43769
[Patent Literature 9]
Japanese Unexamined Patent Application, First Publication No. 2001-354788

Non Patent Literature

[Non Patent Literature 1]
Masaki Shimbo, "Epoxy Resin Handbook", Nikkan Kogyo Shimbun, Dec. 25, 1987 (Showa 62), p. 155-156

SUMMARY OF INVENTION

Technical Problem

The resin compositions described in (1) and (2) exploit a urethanation reaction. Accordingly, due to the influence of moisture in the resin compositions, a thickening reaction rate and the condition of the B-stage significantly change. Therefore, it is difficult to secure the handleability of SMC and the B-stage stability.

Although the resin composition described in (3) has quick curing properties, the storage stability of the composition is poor. Therefore, it is difficult to secure the handleability of SMC and the B-stage stability.

The liquid adhesive described in (4) uses a curing agent (polyamine, mercaptan, isocyanate, imidazole, polyamide, polysulfide phenol, a $BF_3$ complex, ketimine, or the like) activated at a temperature of 20° C. to 100° C. Accordingly, this adhesive is gelated by a curing reaction as a first stage. Therefore, this adhesive exhibits low fluidity before curing as a second stage and is not easily bulked up, and consequently, cannot be used as a matrix resin of SMC.

The reactive hot melt adhesive described in (5) has high viscosity, and reinforcing fiber cannot be favorably impregnated with the adhesive. Consequently, the adhesive cannot be used as a matrix resin of SMC.

Patent Literature 5 describes that when prepreg is manufactured using the resin composition for impregnation described in (6), a solvent is incorporated into the resin composition for impregnation, and heating is performed so that the solvent is removed and a curing reaction partially proceeds. With this method, a solvent is easily removed. Therefore, this method is applicable to the manufacturing of thin prepreg in which a temperature variation resulting from thickness during heating and cooling is small. However, in a thick sheet such as SMC, it is difficult to remove a solvent, and a large temperature variation occurs. Therefore, a defective product is obtained in which the surface condition becomes different from the interior condition after B-staging.

The epoxy resin composition described in (7) consumes a long time until it is B-staged at room temperature (23° C.). Furthermore, after the B-staging at room temperature, the composition has low viscosity and extremely strong tackiness. Therefore, this composition is unsuitable for SMC.

The resin composition described in (8) contains 2,5-dimethyl-2,5-hexanediamine. Therefore, the pot life of the composition is short. In addition, because this resin composition contains mecenediamine, the curing properties thereof are insufficient. Accordingly, this composition is unsuitable for a matrix resin of SMC.

An object of the present invention is to provide a sheet molding compound which can inhibit the formation of burrs during press molding, enables a matrix resin to exhibit excellent fluidity and excellent quick curing properties during press molding, and makes it possible to obtain a fiber-reinforced composite excellent in mold release properties, mechanical characteristics, and heat resistance. Another object of the present invention is to provide a fiber-reinforced composite excellent in mold release properties, mechanical characteristics, and heat resistance.

Solution to Problem

As a result of intensive studies, the inventors of the present invention have found that the gel time and the temperature at the start of curing reaction of an epoxy resin composition have a causal relationship with the formation of burrs during the molding of a sheet molding compound. The inventors have also found that the above objects can be achieved by controlling the gel time and the temperature at the start of curing reaction of the epoxy resin composition. Based on the finding, the inventors have accomplished the present invention.

The present invention has the following aspects.

[1] A sheet molding compound containing an epoxy resin composition and reinforcing fiber, in which a gel time of the epoxy resin composition is 30 to 140 seconds at 140° C., a temperature at the start of curing reaction of the epoxy resin composition is 70° C. to 115° C., and when b1 represents a viscosity of the epoxy resin composition measured at 30° C. 7 days after the preparation of the composition, and b2 represents a viscosity of the epoxy resin composition measured at 30° C. 14 days after the preparation of the composition, b1 and b2 satisfy b2/b1≤5.

[2] A sheet molding compound containing an epoxy resin composition and reinforcing fiber, in which the epoxy resin composition contains a reaction product of an epoxy resin and an acid anhydride, a gel time of the epoxy resin composition is 30 to 140 seconds at 140° C., and a temperature at the start of curing reaction of the epoxy resin composition at is 70° C. to 115° C.

[3] A sheet molding compound containing an epoxy resin composition and reinforcing fiber, in which the epoxy resin composition contains the following component (A), a component (B), and component (C).

Component (A): an epoxy resin staying in a liquid state at 25° C.

Component (B): an acid anhydride staying in a liquid state at 25° C.

Component (C): a curing agent having a melting point of 40° C. or higher and lower than 180° C.

[4] The sheet molding compound described in [3], in which the component (B) contains 0.1 to 0.5 equivalents of acid anhydride groups with respect to 1 equivalent of epoxy groups contained in the epoxy resin composition.

[5] The sheet molding compound described in [3] or [4], in which the component (C) comprises a curing agent having a melting point of 40° C. or higher and 120° C. or lower.

[6] The sheet molding compound described in any one of [3] to [5], in which the epoxy resin composition contains 1 to 30 parts by mass of the component (B) and 1 to 10 parts by mass of the component (C) with respect to a total mass (100 parts by mass) of the epoxy resin contained in the epoxy resin composition.

[7] The sheet molding compound described in any one of [3] to [6], in which the epoxy resin composition further contains the following component (D).

Component (D): a curing agent having a melting point of 180° C. to 300° C.

[8] The sheet molding compound described in [7], in which the epoxy resin composition contains 0.1 to 10 parts by mass of the component (D) with respect to a total mass (100 parts by mass) of the epoxy resin contained in the epoxy resin composition.

[9] The sheet molding compound described in any one of [3] to [8], in which the component (A) comprises a glycidylamine-based epoxy resin, and a content of the glycidylamine-based epoxy resin contained in the component (A) is 1% to 30% by mass with respect to a total mass (100% by mass) of the component (A).

[10] The sheet molding compound described in any one of [1] to [9], in which the epoxy resin composition is a thickened product of the epoxy resin composition.

[11] The sheet molding compound described in any one of [1] to [10], in which a viscosity of the epoxy resin composition at the start of curing reaction is 0.4 to 100 Pa·s.

[12] The sheet molding compound described in any one of [1] to [11], in which the reinforcing fiber has an average length of 0.3 to 10 cm.

[13] A fiber-reinforced composite which is a press-molded product of the sheet molding compound described in any one of [1] to [12].

Advantageous Effects of Invention

The sheet molding compound of the present invention can inhibit the formation of burrs during press molding, enables a matrix resin to exhibit excellent fluidity and excellent quick curing properties during press molding, and makes it possible to obtain a fiber-reinforced composite excellent in mold release properties, mechanical characteristics, and heat resistance.

Furthermore, the fiber-reinforced composite of the present invention is a press-molded product of the sheet molding compound of the present invention and excellent in mold release properties, mechanical characteristics and heat resistance.

DESCRIPTION OF EMBODIMENTS

The following definitions of terms are applied to the present specification and claims.

"Staying in a liquid state at 25° C." means that a substance stays in a liquid state under a condition of 25° C. and 1 atm.

"Staying in a solid state at 25° C." means that a substance stays in a solid state under a condition of 25° C. and 1 atm.

"Epoxy resin" is a compound having two or more epoxy groups in a molecule.

"Acid anhydride group" is a group having a structure in which one water molecule is removed from two acid groups (carboxy groups and the like).

"Acid anhydride" is a compound having an acid anhydride group.

"Hydrogenated phthalic anhydride" is a compound in which a part or all of unsaturated carbon bonds in a benzene ring of phthalic anhydride are substituted with a saturated carbon bond.

"Thickened product" is a B-staged epoxy resin composition obtained by preparing an epoxy resin composition by mixing together components to be incorporated into the epoxy resin composition and leaving the epoxy resin composition to stand in an environment of 23° C. for 7 to 14 days from immediately after the preparation.

"Sheet molding compound (SMC)" is a sheet-like molding material containing short reinforcing fiber and a thermosetting resin.

"Viscosity" is a value measured using a rheometer under a condition of measurement mode: constant stress, stress: 300 Pa, frequency: 1.59 Hz, plate diameter: 25 mm, plate type: parallel plate, and plate gap: 0.5 mm.

"Burr" means an unnecessary portion formed at the end of a molded product (press-molded product of SMC) due to flowing out of an epoxy resin composition into a gap between upper and lower molding dies which is followed by solidification during a press molding of SMC.

"Room temperature" means 25° C.

"To" used for describing a range of numerical values means that the range includes numerical values listed before and after "to" as a lower limit and an upper limit.

[Sheet Molding Compound]

The sheet molding compound of the present invention contains an epoxy resin composition and reinforcing fiber.

<Epoxy Resin Composition>

The epoxy resin composition contained in SMC of the present invention preferably contains a component (A): an epoxy resin staying in liquid state at 25° C., a component (B): an acid anhydride staying in a liquid state at 25° C., and a component (C): a curing agent having a melting point of 40° C. or higher and lower than 180° C. The epoxy resin composition more preferably further contains a component (D): a curing agent having a melting point of 180° C. to 300° C.

Due to the interaction of the component (B) and the component (A), an ester bond is formed in the epoxy resin composition. Immediately after being prepared, the epoxy resin composition can be thickened by the reaction product of the epoxy resin and the acid anhydride. The thickened product containing the reaction product of the epoxy resin and the acid anhydride may be a matrix resin of SMC of the present invention. Alternatively, the matrix resin of the present invention may contain the reaction product of the epoxy resin and the acid anhydride.

It is preferable that the epoxy resin composition contained in SMC of the present invention is a thickened product of the epoxy resin composition, because then the productivity and handleability of SMC can be simultaneously satisfied, the B-stage stability of SMC tends to be further improved (that is, the SMC can be maintained in a B-stage for a long period of time), the viscosity of SMC changes little over time, and the storage stability of SMC tends to be excellent.

The gel time of the epoxy resin composition at 140° C. is 30 to 140 seconds, preferably 40 to 120 seconds, and more preferably 50 to 85 seconds.

When the gel time at 140° C. is 30 seconds or longer, preferably 40 seconds or longer, and more preferably 50 seconds or longer, during the press molding of SMC, the fluidity of the matrix resin is improved. When the gel time at 140° C. is 140 seconds or shorter, preferably 120 seconds or shorter, more preferably 85 seconds or shorter, during the press molding of SMC, the formation of burrs can be inhibited, the demolding operation does not take much time, and the productivity can be maintained. Furthermore, when the gel time at 140° C. is within the above range, during the press molding of SMC, the matrix resin exhibit excellent quick curing properties.

The gel time of the epoxy resin composition can be adjusted by the formulation of the epoxy resin composition.

The gel time of the epoxy resin composition is a value measured as follows.

That is, immediately after being prepared, the epoxy resin composition is put and sealed into an airtightable container and left to stand at 23° C. for 7 days. Cover glass was left for 120 seconds on a hot plate preheated to 140° C. Seven days after being prepared, the epoxy resin composition is placed on the cover glass, another cover glass is placed thereon so that the epoxy resin composition is interposed between the cover glasses, and the measurement of time is started immediately after the composition is interposed between the cover glasses. The upper cover glass is moved using tweezers or the like, and the time taken for the cover glass to stop moving is measured and adopted as a gel time of the epoxy resin composition at 140° C.

The gel time measured for the simple epoxy resin composition is substantially the same as the gel time measured for the epoxy resin composition in the state of SMC.

The temperature of the epoxy resin composition at the start of curing reaction is 70° C. to 115° C., preferably 80° C. to 110° C., and more preferably 90° C. to 105° C.

When the temperature at the start of curing reaction is 70° C. or higher, preferably 80° C. or higher, and more preferably 90° C. or higher, during the press molding of SMC, the fluidity of the matrix resin is improved. When the temperature at the start of curing reaction is 115° C. or lower, preferably 110° C. or lower, and more preferably 105° C. or lower, the formation of burrs can be inhibited, the demolding operation does not take much time, and the productivity can be maintained. Furthermore, when the temperature at the start of curing reaction is within the above range, during the press molding of SMC, the matrix resin exhibits excellent quick curing properties.

The temperature of the epoxy resin composition at the start of curing reaction can be adjusted by the formulation of the epoxy resin composition.

The viscosity of the epoxy resin composition at the start of curing reaction is preferably 0.4 to 100 Pa·s, more preferably 0.6 to 80 Pa·s, and even more preferably 0.8 to 50 Pa·s.

When the viscosity at the start of curing reaction is 0.4 Pa·s or higher, preferably 0.6 Pa·s or higher, and more preferably 0.8 Pa·s or higher, during the press molding of SMC, the formation of burrs can be inhibited. When the viscosity at the start of curing reaction is 100 Pa·s or lower, preferably 80 Pa·s or lower, and more preferably 50 Pa·s or lower, during the press molding of SMC, the fluidity of the matrix resin is further improved.

The viscosity of the epoxy resin composition at the start of curing reaction can be adjusted by the formulation of the epoxy resin composition.

The temperature and viscosity of the epoxy resin composition at the start of curing reaction are values measured as follows.

That is, immediately after being prepared, the epoxy resin composition is put and sealed into an airtightable container and left to stand at 23° C. for 7 days. Then, by using a rheometer, the epoxy resin composition kept for 7 days after being prepared is heated from 25° C., and the viscosity thereof is measured under the conditions of measurement mode: constant stress, level of stress: 300 Pa, frequency: 1.59 Hz, plate diameter: 25 mm, plate type: parallel plate, plate gap: 0.5 mm, and heating rate: 2° C./min. The viscosity at a point in time when the curing reaction of the epoxy resin composition is about to start (that is, at a point in time when the viscosity is about to rapidly increases) is adopted as the viscosity of the epoxy resin composition at the start of curing reaction. In addition, the temperature at a point in time when the curing reaction of the epoxy resin composition is about to start is adopted as the temperature of the epoxy resin composition at the start of curing reaction.

The temperature at the start of curing reaction measured for the simple epoxy resin composition is substantially the same as the temperature at the start of curing reaction measured for the epoxy resin composition in the state of SMC.

The viscosity at the start of curing reaction measured for the simple epoxy resin composition is substantially the same as the viscosity at the start of curing reaction measured for the epoxy resin composition in the state of SMC.

The viscosity of the epoxy resin composition that is measured by the following viscometry (a) at 30° C. 30 minutes after the preparation of the composition is preferably 0.5 to 15 Pa·s, more preferably 0.5 to 10 Pa·s, and even more preferably 1 to 5 Pa·s.

When the viscosity measured at 30° C. 30 minutes after the preparation of the composition is 0.5 Pa·s or higher and more preferably 1 Pa·s or higher, during the manufacturing SMC, the accuracy of a basis weight (thickness of the epoxy resin composition) during the coating of a film with the epoxy resin composition tends to be easily stabilized. Furthermore, when the viscosity measured at 30° C. 30 minutes after the preparation of the composition is 15 Pa·s or lower, more preferably 10 Pa·s or lower, and even more preferably 5 Pa·s or lower, during the manufacturing SMC by using the epoxy resin composition, reinforcing fiber, and the like, the reinforcing fiber tends to be impregnated better with the epoxy resin composition. Therefore, this epoxy resin composition can be suitably used for manufacturing SMC.

Viscometry (a): immediately after being prepared, the epoxy resin composition is put and sealed into an airtightable container and left to stand for 30 minutes at 23° C., and then a viscosity of the epoxy resin composition at 30° C. is measured.

The viscosity of the epoxy resin composition measured by the following viscometry (b) at 30° C. 7 days and 14 days after the preparation of the composition is preferably 5,000 to 75,000 Pa·s, more preferably 6,000 to 60,000 Pa·s, and even more preferably 7,000 to 50,000 Pa·s.

When the viscosity measured at 30° C. 7 days and 14 days after the preparation of the composition is 5,000 Pa·s or higher, preferably 6,000 Pa's or higher, and more preferably 7,000 Pa's or higher, the surface tackiness in handling SMC is within an appropriate range, and a cutting or laminating operation tends to be easier. When the viscosity measured at 30° C. 7 days and 14 days after the preparation of the composition is 75,000 Pa·s or lower, preferably 60,000 Pa's or lower, and more preferably 50,000 Pas or lower, the draping properties of SMC fall into an appropriate range, and the handleability tends to be favorable.

Viscometry (b): immediately after being prepared, the epoxy resin composition is put and sealed into an airtightable container and left to stand for 7 days or 14 days at 23° C., and then a viscosity of the epoxy resin composition at 30° C. is measured.

When b1 represents a viscosity measured at 30° C. 7 days after the preparation of the epoxy resin composition, and b2 represents a viscosity measured at 30° C. 14 days after the preparation of the epoxy resin composition, b1 and b2 preferably satisfy $b2/b1 \leq 5$, more preferably satisfy $b2/b1 \leq 4$, and even more preferably satisfy $b2/b1 \leq 3$.

When b1 and b2 satisfy $b2/b1 \leq 5$, preferably satisfy $b2/b1 \leq 4$, and more preferably satisfy $b2/b1 \leq 3$, the B-stage stability of the epoxy resin composition or a thickened product of the epoxy resin composition in SMC is further improved. That is, the epoxy resin composition tends to be maintained in a B-stage for a long period of time, the viscosity of SMC changes little over time, and the storage stability tends to be excellent.

(Component (A))

The component (A) is an epoxy resin staying in a liquid state at 25° C.

The component (A) is a component which adjusts the viscosity of the epoxy resin composition to be within the above range so that reinforcing fiber is impregnated better with the epoxy resin composition during the manufacturing of SMC. In addition, the component (A) is a component that improves the mechanical characteristics and heat resistance of the fiber-reinforced composite which is a press-molded product of SMC. When the component (A) has an aromatic ring, it is easy to adjust the mechanical characteristics of the fiber-reinforced composite to be within a desired range.

Examples of the component (A) include glycidyl ether of bisphenols (bisphenol A, bisphenol F, bisphenol AD, halogen-substituted compounds of these bisphenols, and the like) (bisphenol-type epoxy resins); glycidyl ether of polyphenols obtained by a condensation reaction between phenols and an aromatic carbonyl compound; glycidyl ether of polyols (polyoxyalkylene bisphenol A and the like); a polyglycidyl compound derived from aromatic amines; and the like.

As the component (A), a bisphenol-type epoxy resin is preferable, because this resin makes it easy to adjust the viscosity of the epoxy resin composition to be appropriate for impregnating reinforcing fiber with the composition, and makes it easy to adjust the mechanical characteristics of the fiber-reinforced composite to be within a desired range.

As the bisphenol-type epoxy resin, a difunctional bisphenol-type epoxy resin is preferable. Herein, "difunctional" means having two epoxy groups in a molecule.

In an aspect, a bisphenol A-type epoxy resin is more preferable, because this resin enables the fiber-reinforced composite to have favorable heat resistance and favorable chemical resistance.

In another aspect, a bisphenol F-type epoxy resin is more preferable, because this resin has viscosity lower than that of the bisphenol A-type epoxy resin having approximately the same molecular weight, and increases the elastic modulus of the fiber-reinforced composite.

In still another aspect, as the component (A), alicyclic epoxy resin is also preferable because this resin has low viscosity and can improve the heat resistance and the weather resistance.

The component (A) may be an epoxy resin having three or more functional groups. Particularly, a trifunctional epoxy resin and a tetrafunctional epoxy resin can further improve the heat resistance of the fiber-reinforced composite without significantly change the viscosity of the epoxy resin composition. Herein, "trifunctional" means having three epoxy groups in a molecule. "Tetrafunctional" means having four epoxy groups in a molecule.

Examples of commercial products of the difunctional bisphenol-type epoxy resin include the following ones.

jER (registered trademark, the same is applied in the following description) 825, 827, 828, 828EL, 828XA, 806, 806H, 807, 4004P, 4005P, 4007P, and 4010P manufactured by Mitsubishi Chemical Corporation, EPICLON (registered trademark) 840, 840-S, 850, 850-S, EXA-850CRP, 850-LC, 830, 830-S, 835, EXA-830CRP, EXA-830LVP, and EXA-835LV manufactured by DIC Corporation, EPOTORT (registered trademark) YD-115, YD-115G, YD-115CA, YD-118T, YD-127, YD-128, YD-128G, YD-128S, YD-128CA, YDF-170, YDF-2001, YDF-2004, and YDF-2005RL manufactured by NIPPON STEEL & SUMIKIN CHEMICAL CO., LTD., and the like.

Examples of commercial products of the difunctional alicyclic epoxy resin include the following ones.

CELLOXIDE (registered trademark) 2021P, 2081, and 2000 manufactured by DAICEL CORPORATION, TTA26 manufactured by Jiangsu Tetra New Material Technology Co., Ltd., and the like.

Examples of commercial products of the component (A) having three or more functional groups include the following ones.

jER 152, 154, 157S70, 1031S, 1032H60, 604, 630, and 630LSD manufactured by Mitsubishi Chemical Corporation, N-730A, N-740, N-770, N-775, N-740-80M, N-770-70M, N-865, N-865-80M, N-660, N-665, N-670, N-673, N-680, N-690, N-695, N-665-EXP, N-672-EXP, N-655-EXP-S, N-662-EXP-S, N-665-EXP-S, N-670-EXP-S, N-685-EXP-S, and HP-5000 manufactured by DIC Corporation, TETRAD-X manufactured by Mitsubishi Gas Chemical Corporation, and the like.

One kind of component (A) may be used singly, or two or more kinds of components (A) may be used in combination.

Particularly, when the component (A) comprises a glycidyl amine-based epoxy resin such as TETRAD-X, it is possible to hasten the temporal change of viscosity of the epoxy resin composition.

That is, when the content of the glycidyl amine-based epoxy resin is adjusted, the viscosity b1 or the viscosity b2 described above can be controlled. Therefore, during the manufacturing SMC, the epoxy resin composition is more rapidly B-staged, and accordingly, the productivity thereof can be increased.

As the glycidylamine-based epoxy resin, N,N,N',N'-tetraglycidyl-m-xylylenediamine is preferable because this resin makes it easy to adjust the thickening speed and hardly deteriorates physical properties.

When the epoxy resin composition contains a glycidylamine-based epoxy resin as the component (A), the content of the glycidylamine-based epoxy resin contained in the component (A) with respect to the total mass (100% by mass) of the component (A) is preferably 1% to 30% by mass, more preferably 2% to 20% by mass, and even more preferably 3% to 15% by mass.

When the content of the glycidylamine-based epoxy resin with respect to the total mass of the component (A) is 1% by mass or higher, more preferably 2% by mass or higher, and even more preferably 3% by mass or higher, the time taken for the epoxy resin composition to be B-staged tends to be suitably reduced. When the content of the glycidylamine-based epoxy resin with respect to the total mass of the component (A) is 30% by mass or lower, more preferably 20% by mass or lower, and even more preferably 15% by mass or lower, the storage stability of SMC tends to be favorable.

The viscosity of the component (A) at 25° C. may be such that the viscosity of the epoxy resin composition measured at 30° C. 30 minutes after the preparation of the composition is 0.5 to 15 Pa·s. The viscosity of the component (A) at 25° C. is preferably 0.3 to 500 Pa·s, and more preferably 0.3 to 400 Pa·s.

The content of the component (A) in the epoxy resin composition is preferably set so that the viscosity of the epoxy resin composition measured at 30° C. 30 minutes after the preparation of the composition is 0.5 to 15 Pa·s. The content of the component (A) can be selected according to the type of the component (A).

The content of the component (A) in the epoxy resin composition with respect to the total mass (100% by mass) of the entire epoxy resin contained in the epoxy resin composition is preferably 20% to 100% by mass, and more preferably 50% to 95% by mass.

When the content of the component (A) in the epoxy resin composition is within the above range, the viscosity of the epoxy resin composition measured at 30° C. 30 minutes after the preparation of the composition can be easily adjusted to be within the above range, and reinforcing fiber is impregnated better with the epoxy resin composition. Furthermore, the heat resistance of the fiber-reinforced composite is further improved.

(Component (B))

The component (B) is an acid anhydride staying in a liquid state at 25° C.

The component (B) is a component which can act on the component (A) at room temperature and thickens the epoxy resin composition immediately after the composition is prepared so that the epoxy resin composition is B-staged.

Because the component (B) stays in a liquid state at 25° C., the components in the epoxy resin composition are uniformly mixed together, and the epoxy resin composition can be uniformly thickened at 25° C.

Examples of the component (B) include a cyclic acid anhydride having one structure or two or more structures (cyclic acid anhydride groups) derived by the removal of one water molecule from two acids in a molecule.

Examples of the cyclic acid anhydride having one cyclic acid anhydride group in a molecule include dodecenyl succinic anhydride, polyadipic anhydride, polyzelaic anhydride, methyl tetrahydrophthalic anhydride, methyl hexahydrophthalic anhydride, methyl himic anhydride, hexahydrophthalic anhydride, phthalic anhydride, trimellitic anhydride, 3-acetamidophthalic anhydride, 4-pentene-1,2-dicarboxylic anhydride, 6-bromo-1,2-dihydro-4H-3,1-benzoxazine-2,4-dione, 2,3-anthracene dicarboxylic anhydride, and the like.

Examples of the cyclic acid anhydride having two cyclic acid anhydride groups in a molecule include glyceryl bisanhydrotrimellitate monoacetate, ethylene glycol bisanhydrotrimellitate, pyromellitic anhydride, benzophenone tetracarboxylic anhydride, 1,2,3,4-cyclobutane tetracarboxylic dianhydride, bicyclo[2.2.2]-oct-7-ene-2,3,5,6-tetracarboxylic dianhydride, diphenyl-3,3',4,4'-tetracarboxylic dianhydride, cyclopentane tetracarboxylic dianhydride, 1,2,4,5-cyclohexane tetracarboxylic dianhydride, 4-(2,5-dioxotetrahydrofuran-3-yl)-tetralin-1,2-dicarboxylic anhydride, 5-(2,5-dioxotetrahydrofuryl)-3-methyl-3-cyclohexene-1,2-dicarboxylic anhydride, N,N-bis[2-(2,6-dioxomorpholino)ethyl]glycine, 4,4'-sulfonyldiphthalic anhydride, 4,4'-ethylenebis(2,6-morpholinedione), 4,4'-(4,4'-isopropylidenediphenoxy)bis(phthalic anhydride), 4,4'-(hexafluoroisopropylidene)diphthalic anhydride, and the like.

As the component (B), in view of the stability of viscosity of the epoxy resin composition and the heat resistance or mechanical characteristics of the cured product of the epoxy resin composition, phthalic anhydride or hydrogenated phthalic anhydride which may have a substituent is preferable, and a compound represented by Formula (1) or a compound represented by Formula (2) is more preferable.

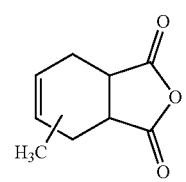

(1)

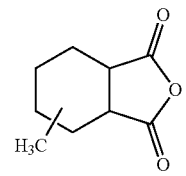

(2)

One kind of component (B) may be used singly, or two or more kinds of components (B) may be used in combination.

The content of the component (B) in the epoxy resin composition is preferably set so that the amount of acid anhydride groups with respect to 1 equivalent of epoxy groups contained in the epoxy resin composition is 0.1 to 0.5 equivalents, more preferably set so that the amount of the acid anhydride groups is 0.1 to 0.4 equivalents, and even more preferably set so that the amount of the acid anhydride groups is 0.1 to 0.3 equivalents.

When the content of the component (B) in the epoxy resin composition is within the above range, B-staging of the epoxy resin composition proceeds appropriately. When the content of the component (B) is set so that the amount of acid anhydride groups is 0.1 equivalents or greater with respect to 1 equivalent of epoxy groups contained in the epoxy resin composition, the epoxy resin composition favorably reaches B stage, appropriate tackiness is obtained, and a carrier film tends to be favorably released from SMC. When the content of the component (B) is set so that the amount of acid anhydride groups with respect to 1 equivalent of epoxy groups contained in the epoxy resin composition is 0.5 equivalents or less, more preferably 0.4 equivalents or less, and even more preferably 0.3 equivalents or less, B-staging of the epoxy resin composition to proceeds appropriately. Therefore, favorable draping properties are obtained, and the workability of a cutting operation, a laminating operation, and the like of SMC tends to be favorable.

The content of the component (B) in the epoxy resin composition with respect to the total mass (100 parts by mass) of the entire epoxy resin contained in the epoxy resin composition is preferably 1 to 30 parts by mass, more preferably 3 to 25 parts by mass, and even more preferably 5 to 20 parts by mass.

When the content of the component (B) in the epoxy resin composition is within the above range, B-staging of the epoxy resin composition proceeds appropriately. When the content of the component (B) with respect to the total mass of the entire epoxy resin contained in the epoxy resin composition is 1% by mass or higher, more preferably 3% by mass or higher, and even more preferably 5% by mass or higher, the epoxy resin composition favorably reaches B stage, appropriate tackiness is obtained, and a carrier film tends to be favorably released from SMC. When the content of the component (B) with respect to the total mass of the entire epoxy resin contained in the epoxy resin composition is 30 parts by mass or less, more preferably 25% by mass or less, and even more preferably 20% by mass or less, B-staging of the epoxy resin composition proceeds appropriately. Therefore, favorable draping properties are obtained, and the workability of a cutting operation, a laminating operation, and the like of SMC tends to be favorable.

Furthermore, when the epoxy resin composition contains, as the component (B), the aforementioned cyclic acid anhydride having two cyclic acid anhydride groups in a molecule, the content of the cyclic acid anhydride having two cyclic acid anhydride groups in a molecule with respect to the total mass (100 parts by mass) of the entire epoxy resin contained in the epoxy resin composition is preferably 1 to 20 parts by mass, more preferably 1 to 10 parts by mass, and even more preferably 1 to 5 parts by mass.

When the content of the cyclic acid anhydride, which has two cyclic acid anhydride groups in a molecule, in the epoxy resin composition is within the above range, the fluidity of the matrix resin during the press molding of SMC tends to be further improved. The content of the compound, which has two cyclic acid anhydride groups in a molecule, with respect to the total mass of the entire epoxy resin contained in the epoxy resin composition is 20 parts by mass or less, preferably 10 parts by mass or less, and even more preferably 5 parts by mass or less. When the content of the compound is within the above range, a molding die tends to be fully filled with SMC.

(Component (C))

The component (C) is a curing agent having a melting point of 40° C. or higher and lower than 180° C.

The component (C) is a component which functions as a curing agent for the epoxy resin and acts as a catalyst so as to cause the component (A) and the component (B) to react with each other at room temperature during B-staging in which the component (A) and the component (B) react with each other.

It is preferable that the component (C) stays in a solid state at 25° C. Because the component (C) stays in a solid state at 25° C., the component (C) is inhibited from reacting during the manufacturing of SMC or during the storage of the manufactured SMC. Therefore, the productivity, storage stability, and handleability of SMC, the fluidity of a matrix resin during the press molding, and the like tend to be further improved.

The melting point of the component (C) is 40° C. or higher and lower than 180° C., preferably 50° C. to 170° C., more preferably 60° C. to 150° C., and even more preferably 65° C. to 120° C. In another aspect, the melting point of the component (C) is 40° C. or higher and lower than 180° C., and preferably 40° C. to 120° C.

When the melting point of the component (C) is 40° C. or higher, preferably 50° C. or higher, more preferably 60° C. or higher, and even more preferably 65° C. or higher, it is possible to inhibit this component from rapidly reacting even at a low temperature, and the molding properties and storage stability of SMC tends to be favorable. When the melting point of the component (C) is lower than 180° C., preferably 170° C. or lower, more preferably 150° C. or lower, and even more preferably 120° C. or lower, the formation of burrs tends to be further inhibited during the press molding of SMC. In addition, the curing time is not excessively prolonged, and the productivity tends to be improved.

The melting point of the component (C) is a value measured using a differential scanning calorimeter (Q1000 manufactured by TA Instruments). Specifically, about 3 mg of a measurement sample is filled into a dedicated aluminum hermetic pan, and measured while being heated to 300° C. from −50° C. at a heating rate of 10° C./min. The obtained data is plotted on a graph in which the ordinate shows temperature and the abscissa shows heating value. In this graph, an inflection point where the base line of the heating value meets the peak top resulting from the endothermic reaction is taken as a melting point.

The average particle diameter of the component (C) is preferably 25 μm or less, and more preferably 1 to 15 μm.

When the average particle diameter of the component (C) is 25 μm or less and more preferably 15 μm or less, the component (C) has a sufficient surface area, and the content of the component (C) in the epoxy resin composition can be reduced, and the time taken for curing SMC can be reduced. Furthermore, the component (C) is easily uniformly dispersed in the epoxy resin composition, the proportion of the unreacted component (C) in the cured product can be reduced, and the physical properties of the press-molded product of SMC of the present invention are improved.

The average particle diameter of the component (C) is a value measured using a spray particle size distribution analyzer.

Examples of the component (C) include aliphatic amine, aromatic amine, modified amine, secondary amine, tertiary amine, an imidazole-based compound, mercaptans, and the like having a melting point of 40° C. or higher and lower than 180° C.

Specifically, examples of the component (C) include 1H-imidazole (melting point: 90° C.), 2-methylimidazole (melting point: 144° C.), 2-undecylimidazole (melting point: 73° C.), 2-phenylimidazole (melting point: 142° C.), 2-phenyl 4-methylimidazole (melting point: 179° C.), 1-cyanoethyl-2-methylimidazole (melting point: 55° C.), 1-cyanoethyl-2-phenylimidazole (melting point: 108° C.), and the like.

The component (C) may also be an amine-modified compound as long as the melting point thereof is 40° C. or higher and lower than 180° C. Examples of such a compound include a compound of 2-methylimidazole and phenylglycidyl ether or bisphenol A diglycidyl ether (epoxy resin amine adduct) and the like.

Examples of commercial products of the epoxy resin amine adduct include PN-23 (melting point: 60° C.), PN-23J (melting point: 60° C.), PN-31 (melting point: 52° C.), PN-31J (melting point: 52° C.), PN-40 (melting point: 76° C.), PN-40J (melting point: 76° C.), PN-50 (melting point: 83° C.), PN-50J (melting point: 84° C.), and P-0505 (melting point: 69° C.) manufactured by Ajinomoto Fine-Techno Co., Inc. Among these, PN-23, PN-23J, PN-31, PN-31J, and P-0505 are preferable.

One kind of component (C) may be used singly, or two or more kinds of components (C) may be used in combination.

The content of the component (C) in the epoxy resin composition with respect to the total mass (100 parts by mass) of the entire epoxy resin contained in the epoxy resin composition is preferably 1 to 10 parts by mass, more preferably 2 to 8 parts by mass, and even more preferably 4 to 8 parts by mass.

When the content of the component (C) with respect to the total mass of the entire epoxy resin contained in the epoxy resin composition is 1 part by mass or higher, more preferably 2 parts by mass or higher, and even more preferably 4 parts by mass or higher, the formation of burrs during the press molding of SMC tends to be further inhibited. When the content of the component (C) with respect to the total mass of the entire epoxy resin contained in the epoxy resin composition is 10 parts by mass or less, and more preferably 8 parts by mass or less, reinforcing fiber tends to be impregnated better with the epoxy resin composition.

(Component (D))

The component (D) is a curing agent having a melting point of 180° C. to 300° C.

When the epoxy resin composition contains the component (D), the storage stability of SMC can be improved.

The melting point of the component (D) is a value measured by the same method as the method used for measuring the melting point of the component (C).

The average particle diameter of the component (D) is preferably 25 μm or less, and more preferably 1 to 15 μm.

When the average particle diameter of the component (D) is 25 μm or less and more preferably 15 μm or less, the component (D) has a sufficient surface area, and the content of the component (D) in the epoxy resin composition can be reduced, and the time taken for curing SMC can be reduced. Furthermore, the component (D) is easily uniformly dispersed in the epoxy resin composition, the proportion of the unreacted component (D) in the cured product can be reduced, and the physical properties of the press-molded product of SMC of the present invention are improved.

The average particle diameter of the component (D) is a value measured by the same method as the method used for measuring the average particle diameter of the component (C).

Examples of the component (D) include dicyandiamide, imidazole-based compounds having a melting point of 180° C. to 300° C., and the like.

From the viewpoint of further improving the heat resistance of the press-molded product of SMC of the present invention, among the imidazole-based compounds, 2,4-diamino-6-[2'-methylimidazolyl-(1')]-ethyl-s-triazine (melting point: 253° C.) is particularly suitable.

Furthermore, when the epoxy resin composition further contains dicyandiamide (melting point: 206° C.) as the component (D), it is possible to further improve the toughness and heat resistance of the press-molded product of SMC obtained from the epoxy resin composition without impairing B-stageability of the epoxy resin composition, B-stage stability, and the quick curing properties.

One kind of component (D) may be used singly, or two or more kinds of components (D) may be used in combination.

The content of the component (D) in the epoxy resin composition with respect to the total mass (100 parts by mass) of the entire epoxy resin contained in the epoxy resin composition is preferably 0.1 to 10 parts by mass, more preferably 0.3 to 7 parts by mass, and even more preferably 1 to 5 parts by mass.

When the content of the component (D) with respect to the total mass of the entire epoxy resin contained in the epoxy resin composition is 0.1 part by mass or higher, more preferably 0.3 parts by mass or higher, and even more preferably 1 part by mass or higher, the formation of burrs during the press molding of SMC can be further inhibited, and the toughness and heat resistance of the press-molded product of SMC tends to be further improved. When the content of the component (D) with respect to the total mass of the entire epoxy resin contained in the epoxy resin composition is 10 parts by mass or less, more preferably 7 parts by mass or less, and even more preferably 5 parts by mass or less, reinforcing fiber tends to be impregnated better with the epoxy resin composition, and the B-stage stability tends to be improved.

(Other Components)

If necessary, the epoxy resin composition may contain components (other components) other than the component (A), the component (B), the component (C), and the component (D) described above.

Examples of other components that the aforementioned epoxy resin composition may contain if necessary include a thickening accelerator, a curing accelerator for an epoxy resin, an inorganic filler, an internal release agent, a surfactant, an organic pigment, an inorganic pigment, an epoxy resin other than the component (A), resins other than an epoxy resin, and the like.

As the thickening accelerator, an imidazole-based compound staying in a liquid state at 25° C. is suitable, because this compound enables more rapid B-staging of the epoxy resin composition.

Examples of imidazole staying in a liquid state at 25° C. include 2-ethyl-4-methylimidazole, 1,2-dimethylimidazole, 1-benzyl-2-methylimidazole, 1-benzyl-2-phenylimidazole, and the like.

One kind of imidazole staying in a liquid state at 25° C. may be used singly, or two or more kinds of imidazoles staying in a liquid state at 25° C. may be used in combination.

When the epoxy resin composition contains the imidazole staying in a liquid state at 25° C. as a thickening accelerator, the content of the imidazole staying in a liquid state at 25° C. with respect to the total mass (100 parts by mass) of the entire epoxy resin contained in the epoxy resin composition is preferably 0.01 to 0.2 parts by mass, more preferably 0.01 to 0.1 parts by mass, and even more preferably 0.03 to 0.07 parts by mass.

When the content of the imidazole staying in a liquid state at 25° C. with respect to the total mass of the entire epoxy resin contained in the epoxy resin composition is 0.01 parts by mass or higher, and even more preferably 0.03 parts by mass or higher, the time taken for B-staging of the epoxy resin composition tends to be further reduced. When the content of the imidazole staying in a liquid state at 25° C. with respect to the total mass of the entire epoxy resin contained in the epoxy resin composition is 0.2 parts by mass or less, more preferably 0.1 parts by mass or less, and even more preferably 0.07 parts by mass or less, the B-stage stability of the epoxy resin composition tends to be improved.

As the curing accelerator of the epoxy resin, a urea compound is preferable because this compound further improves the mechanical characteristics (bending strength and flexural modulus) of the fiber-reinforced composite.

Examples of the urea compound include 3-phenyl-1,1-dimethylurea, 3-(3,4-dichlorophenyl)-1,1-dimethylurea, 3-(3-chloro-4-methylphenyl)-1,1-dimethylurea, 2,4-bis(3,3-dimethylureide)toluene, 1,1'-(4-methyl-1,3-phenylene)bis(3,3-dimethylurea), and the like.

Furthermore, for the purpose of improving the storage stability of the curing agent, the epoxy resin composition can also contain a compound (for example, boric acid, a boric acid ester compound, or the like) coordinated with an amine. Examples of commercial products of the compound coordinated with an amine include L-070E (manufactured by SHIKOKU CHEMICALS CORPORATION, a mixture of bisphenol A diglycidyl ether, a phenol novolac resin, and a boric acid ester compound) and the like.

Examples of the inorganic filler include calcium carbonate, aluminum hydroxide, clay, barium sulfate, magnesium oxide, glass powder, hollow glass beads, aerosil, and the like.

When the epoxy resin composition contains the inorganic filler, it is possible to suppress the cure shrinkage.

Examples of the internal release agent include carnauba wax, zinc stearate, calcium stearate, and the like.

When the epoxy resin composition contains the internal release agent, SMC is more easily released after being molded.

As the surfactant, in view of migration to the surface of SMC, a liquid surfactant is preferable, and a liquid surfactant containing an alkyl chain having 12 to 18 carbon atoms is more preferable.

When the epoxy resin composition contains a surfactant, a carrier film can be released better from SMC. Furthermore, it is possible to reduce the voids in SMC.

Examples of the epoxy resin other than the component (A) include an epoxy resin which stays in a semi-solid state or solid state at 25° C. As the epoxy resin other than the component (A), an epoxy resin having an aromatic ring is preferable, and a difunctional epoxy resin is more preferable. Furthermore, in addition to the difunctional epoxy resin, for the purpose of improving the heat resistance of the press-molded product of SMC or controlling the viscosity of the epoxy resin composition, various epoxy resins may be incorporated into the epoxy resin composition of the present invention. For improving the heat resistance, a polyfunctional epoxy resin, a novolac-type epoxy resin, or an epoxy resin having a naphthalene skeleton is effective.

Examples of resins other than the epoxy resin include a thermoplastic resin, a thermoplastic elastomer, and an elastomer other than a thermoplastic elastomer, and the like. By changing the viscoelasticity of the epoxy resin composition, these resins make the epoxy resin composition have appropriate viscosity, appropriate storage modulus, and appropriate thixotropic properties and improve the toughness of the cured product of the epoxy resin composition.

As a resin other than the epoxy resin, core-shell type elastomer fine particles are preferable. Examples of commercial products of core-shell type elastomer fine particles include "METABLEN (registered trademark)" (manufactured by Mitsubishi Chemical Corporation), "STAPHYLOID (registered trademark)" (manufactured by Aica Kogyo Co., Ltd.), "PARALOID (registered trademark)" (manufactured by The Dow Chemical Company), and the like. The core-shell type elastomer fine particles are also available as a master batch-type epoxy resin preliminarily dispersed in an epoxy resin. Examples of such a core-shell type elastomer dispersion epoxy resin include "KANEACE (registered trademark, the same is true of the following description)" (manufactured by Kaneka Corporation), "ACRYSET (registered trademark) BP series" (manufactured by NIPPON SHOKUBAI CO., LTD.), and the like.

As a resin other than the epoxy resin, it is preferable to use a core-shell type elastomer dispersion epoxy resin, because this resin can reduce the time required to prepare the epoxy resin composition and enables rubber particles to be favorably dispersed in the epoxy resin composition.

Specifically, it is possible to use the KANEACE MX series manufactured by Kaneka Corporation, such as MX-113, MX-120, MX-125, MX-128, MX-130, MX-135, MX-136, MX-156, MX-153, MX-257, MX-150, MX-154, MX-960, MX-170, MX-267, MX-965, MX-217, MX-416, MX-451, MX-553, MX-710, and MX-714, and the like.

One kind of resin other than the epoxy resin may be used singly, or two or more kinds of resins other than the epoxy resin may be used in combination.

(Method for Preparing Epoxy Resin Composition)

The epoxy resin composition can be prepared by the method known in the related art. For example, the epoxy resin composition may be prepared by mixing together components at once, or prepared by making a master batch in advance by appropriately dispersing the component (C), the component (D) which is used if necessary, and the like in the component (A) and mixing the master batch with the rest of the components. Furthermore, when the internal temperature of the system is increased due to the shear heating caused by kneading and the like, it is preferable to implement a method for inhibiting the increase of temperature during kneading, such as controlling the kneading speed or cooling the preparation kiln or the kneading kiln.

Examples of kneading devices include an electric mortar, attritor, a planetary mixer, a dissolver, a triple roll, a kneader, an all-purpose stirrer, a homogenizer, a homodispenser, a ball mill, a beads mill, and the like. Two or more kinds of kneading devices may be used in combination.

(Effects of Epoxy Resin Composition)

Because the epoxy resin composition contained in SMC of the present invention contains the component (A), the viscosity of the composition can be reduced immediately after the preparation of the composition. For example, the viscosity of the epoxy resin composition measured at 30° C. 30 minutes after the preparation of the composition can be 15

Pa·s or less. Therefore, the composition has excellent reinforcing fiber impregnation properties and can be suitably used for manufacturing SMC.

In addition, the epoxy resin composition contained in SMC of the present invention can be thickened within a short period of time immediately after the preparation of the composition. For example, the viscosity of the epoxy resin composition measured at 30° C. 7 days after the preparation of the composition can be 5,000 to 75,000 Pa·s. Therefore, it is possible to suppress the surface tackiness in handling SMC, and to obtain appropriate draping properties and favorable handleability.

Furthermore, after being thickened, the epoxy resin composition contained in SMC of the present invention can maintain the viscosity for a long period of time. For example, the viscosity of the epoxy resin composition measured at 30° C. 14 days after the preparation of the composition can be 5,000 to 75,000 Pa·s. Therefore, the composition exhibits excellent tackiness and draping properties after B-staging, and the B-stage stability is excellent.

In addition, because the epoxy resin composition contained in SMC of the present invention contains the component (A), the rigidity, mechanical characteristics, and heat resistance of the press-molded product of SMC can be further improved.

<Reinforcing Fiber>

As the reinforcing fiber to be incorporated into SMC of the present invention, various fibers can be adopted depending on the use and usage purpose of SMC. Examples of the fibers include carbon fiber (including graphite fiber, the same is true of the following description), aramid fiber, silicon carbide fiber, alumina fiber, boron fiber, tungsten carbide fiber, glass fiber, and the like. Among these, in view of mechanical characteristics of the fiber-reinforced composite, carbon fiber and glass fiber are preferable, and carbon fiber is particularly preferable.

Usually, the reinforcing fiber is used in the form of a reinforcing fiber tow constituted with 1,000 to 60,000 single filaments. Some of SMCs contain reinforcing fiber that is in the form of a reinforcing fiber tow, while others contain reinforcing fiber that is in the form of separate tows constituted with fewer fibers. Usually, reinforcing fiber in SMC is in the form of tows constituted with fewer fibers.

As the reinforcing fiber, chopped reinforcing fiber tows constituted with short fiber are preferable.

The average length of the reinforcing fiber is preferably 0.3 to 10 cm, more preferably 1 to 5 cm, and even more preferably 2.5 to 5 cm.

When the average length of the reinforcing fiber is within the above range, SMC having molding properties and mechanical characteristics that are well balanced is obtained. When the average length of the reinforcing fiber is 0.3 cm or greater, more preferably 1 cm or greater, and even more preferably 2.5 cm or greater, a fiber-reinforced composite having higher mechanical characteristics tends to be easily obtained. When the average length of the reinforcing fiber is 10 cm or less, and more preferably 5 cm or less, the fluidity of the matrix resin tends to be further improved during the press molding.

It is more preferable that the reinforcing fiber in SMC is a sheet-like substance constituted with chopped reinforcing fiber tows that are two-dimensionally and randomly stacked.

<Method for Manufacturing Sheet Molding Compound>

For example, SMC is manufactured by sufficiently impregnating a sheet-like substance formed of the chopped reinforcing fiber tows with the aforementioned epoxy resin composition and thickening the epoxy resin composition.

As the method for impregnating the sheet-like substance of the chopped reinforcing fiber tow with the epoxy resin composition, various methods known in the related art can be adopted according to the form of the reinforcing fiber. For example, the following method can be adopted.

Two sheets of films uniformly coated with an epoxy resin composition are prepared. Chopped reinforcing fiber tows are randomly scattered on the surface of one of the films coated with the epoxy resin composition, thereby preparing a sheet-like substance of the chopped reinforcing fiber tows. The epoxy resin composition-coated surface of the other film is bonded to the surface of the sheet-like substance of the chopped reinforcing fiber tows, and the obtained laminate is pressed so that the chopped reinforcing fiber tows are impregnated with the epoxy resin composition, thereby obtaining a sheet molding compound precursor (SMC precursor).

When the SMC precursor obtained by impregnating the chopped reinforcing fiber tows with the epoxy resin composition is held as it is for several days to tens of days at a temperature of about room temperature to 60° C. or for several seconds to tens of minutes at a temperature of about 60° C. to 80° C., an epoxy group, which is contained in the component (A) in the epoxy resin composition and other epoxy resins optionally mixed in the composition, and a carboxy group derived from the component (B) cause an esterification reaction, and accordingly, the epoxy resin composition is B-staged (thickens). By thickening the epoxy resin composition in this way, SMC with suppressed surface tackiness that is suitable for a molding operation is obtained.

It is preferable to select the reaction condition for the epoxy group contained in the epoxy resin and the carboxy group derived from the component (B) so that the viscosity of the epoxy resin composition obtained after the esterification reaction that is measured at 30° C. or the viscosity of the epoxy resin composition at the start of curing reaction falls into the range described above.

<Action and Effect>

In SMC of the present invention containing the epoxy resin composition described so far which has a gel time of 30 to 140 seconds at 140° C. and has a temperature at the start of curing reaction of 70° C. to 115° C., a matrix resin exhibits excellent fluidity during the press molding of SMC, and the formation of burrs can be inhibited. Furthermore, in SMC of the present invention, a matrix resin exhibits excellent quick curing properties during the press molding of SMC, that is, a high curing speed is obtained during the press molding. Therefore, SMC stays in a die for a short period of time, and hence the productivity of the fiber-reinforced composite is improved. Particularly, when the epoxy resin composition containing the component (A), the component (B), and the component (C) described above is used, a thickened product of the epoxy resin composition that is further improved in terms of tackiness and draping properties after B-staging is obtained, and the handleability of SMC is further improved.

In addition, according to SMC of the present invention satisfying b2/b1≤5, in which b1 represents a viscosity measured at 30° C. 7 days after the preparation of the composition and b2 represents a viscosity measured at 30° C. 14 days after the preparation of the composition, the B-stage stability of SMC is excellent, the SMC tends to be maintained in a B-stage for a long period of time, the viscosity of SMC changes little over time, and the storage stability of SMC tends to be excellent.

Moreover, SMC of the present invention contains the epoxy resin composition that produces a cured product excellent in rigidity, mechanical characteristics, and heat resistance. Therefore, from SMC of the present invention, it is possible to obtain a fiber-reinforced composite excellent in mold release properties, mechanical characteristics, and heat resistance.

[Fiber-Reinforced Composite]

The fiber-reinforced composite of the present invention is a press-molded product of SMC of the present invention.

The fiber-reinforced composite of the present invention can be manufactured by press-molding SMC of the present invention and curing the epoxy resin composition contained in SMC of the present invention.

Examples of the method for manufacturing the fiber-reinforced composite of the present invention include the following method.

One sheet of SMC of the present invention or a substance constituted with a plurality of sheets of stacked SMC of the present invention is set between a pair of dies. SMC is press-molded (compression-molded) so that the epoxy resin composition contained in SMC is cured, thereby obtaining a press-molded product of SMC, that is, a fiber-reinforced composite which is a cured product of SMC. As a core material, a honeycomb structure such as a corrugated board may be used, and SMC of the present invention may be disposed on either or both of the surfaces thereof.

In the present specification, for example, laminating two sheets of SMC is described as "laminated in 2 ply".

The press molding is preferably performed at a temperature of 120° C. to 230° C.

The press molding is preferably performed for 2 to 60 minutes.

<Action and Effect>

The fiber-reinforced composite of the present invention described so far is a press-molded product of SMC of the present invention. Therefore, the formation of burrs during the press molding is inhibited. As a result, the fiber-reinforced composite of the present invention is excellent in workability, mold release properties, mechanical characteristics, and heat resistance.

Other Embodiments

The present invention is not limited to the embodiments described above, and can be modified in various ways within the scope described in claims. The embodiments, which are obtained by appropriately combining technical means described in the above embodiments with other embodiments, are also included in the technical scope of the present invention.

EXAMPLES

Hereinafter, the present invention will be more specifically described based on examples, but the present invention is not limited thereto.

<Components>

(Component (A))

jER828: bisphenol A-type liquid epoxy resin (manufactured by Mitsubishi Chemical Corporation, viscosity at 25° C.: 12 Pa·s)

jER807: bisphenol F-type liquid epoxy resin (manufactured by Mitsubishi Chemical Corporation, viscosity at 25° C.: 3 Pa·s)

jER827: bisphenol A-type liquid epoxy resin (manufactured by Mitsubishi Chemical Corporation, viscosity at 25° C.: 9 Pa·s)

TETRAD-X: N,N,N',N'-tetraglycidyl-m-xylylenediamine (manufactured by Mitsubishi Chemical Corporation, viscosity at 25° C.: 2 Pa·s)

(Component (B))

HN-2200: 3-methyl-1,2,3,6-tetrahydrophthalic anhydride or 4-methyl-1,2,3,6-tetrahydrophthalic anhydride (manufactured by Hitachi Chemical Co., Ltd., viscosity at 25° C.: 75 mPa·s)

(Component (C))

PN-23J: epoxy resin amine adduct (manufactured by Ajinomoto Fine-Techno Co., Inc., melting point: 59° C., average particle diameter: 5 μm).

PN-31J: epoxy resin amine adduct (manufactured by Ajinomoto Fine-Techno Co., Inc., melting point: 52° C. average particle diameter: 5 μm).

P-0505: epoxy resin amine adduct (manufactured by SHIKOKU CHEMICALS CORPORATION, melting point: 69° C., average particle diameter: 5 μm).

(Component (D))

2MZA-PW: 2,4-diamino-6-[2'-methylimidazole-(1')]-ethyl-s-triazine (manufactured by SHIKOKU CHEMICALS CORPORATION, melting point: 253° C., average particle diameter: about 4 μm)

DICYANEX 1400F: dicyandiamide (manufactured by Air Products and Chemicals, Inc., melting point: 206° C., average particle diameter: 4 μm)

(Other Components)

L-070E: a mixture of bisphenol A diglycidyl ether, a phenol novolac resin, and a boric acid ester compound (manufactured by SHIKOKU CHEMICALS CORPORATION)

Carbon black (inorganic pigment): Mitsubishi carbon black #1000 (manufactured by Mitsubishi Chemical Corporation)

(Preparation of Master Batch)

Each of the component (C) and the component (D) was mixed with jER828 at a ratio of 1:1 (mass ratio). For mixing, a planetary stirring-deaerator MAZERUSTAR (manufactured by KURABO INDUSTRIES LTD.) was used.

Each of the obtained mixtures was kneaded using triple roll, thereby obtaining a master batch.

Examples 1 to 13 and Comparative Example 1

<Preparation of Epoxy Resin Composition>

According to the formulation shown in Tables 1 to 3, components were weighed and put into a flask. For PN-23J, PN-31J, P-0505, carbon black, 2MZA-PW, and DICYANEX 1400F, the master batch was used. The components weighed and put into the flask were uniformly stirred at room temperature, thereby obtaining an epoxy resin composition. For stirring, a planetary stirring-deaerator MAZERUSTAR (manufactured by KURABO INDUSTRIES LTD.) was used.

The obtained epoxy resin composition was measured and evaluated as follows. The results are shown in Tables 1 to 3.

(Viscometry 1: Measurement of Isothermal Viscosity)

Immediately after being prepared, the epoxy resin composition was put and sealed into an airtightable container, and stored by being left to stand in a room at 23° C. in a place protected from direct sunlight. Thirty minutes, 7 days, and 14 days after the preparation of the epoxy resin composition, the viscosity of the composition was measured as below.

The plate of a rheometer (manufactured by Thermo Fisher Scientific, HAAKE-MARS40) was preheated to 25° C. and kept as it was until the temperature became stable. After the temperature was found to be stable, the epoxy resin composition was isolated into the plate, the gap was adjusted, the plate was then left as it was until the normal force became 3 N or lower, and then the measurement was started under the following condition. For 10 minutes, 10 spots were measured, and the final measurement value was adopted as viscosity.

Measurement mode: constant stress,
Level of stress: 300 Pa,
Frequency: 1.59 Hz,
Plate diameter: 25 mm,
Plate type: parallel plate,
Plate gap: 0.5 mm.

The viscosity of the epoxy resin composition measured at 30° C. 30 minutes after the preparation of the composition is a measure of impregnation properties during the impregnation of reinforcing fiber with the epoxy resin composition. The lower the viscosity, the better the impregnation properties.

The viscosity of the epoxy resin composition measured at 30° C. 7 days after the preparation of the composition is a measure for determining whether the epoxy resin composition has turned into an appropriately B-staged thickened product that enables SMC to demonstrate appropriate tackiness or draping properties. Specifically, when the viscosity is in a range of 5,000 to 75,000 Pa·s, it is determined that the epoxy resin composition has turned into an appropriately B-staged thickened product.

The viscosity of the epoxy resin composition measured at 30° C. 14 days after the preparation of the composition is a measure for determining whether the epoxy resin composition can be maintained in a B-stage for a long period of time (B-stage stability). Specifically, when the viscosity is in a range of 5,000 to 75,000 Pa·s, it is determined that the B-stage stability is favorable.

(Viscometry 2: Measurement of Viscosity Under Heating Condition)

Immediately after being prepared, the epoxy resin composition was put and sealed into an airtightable container, and stored by being left to stand in a room at 23° C. in a place protected from direct sunlight. The viscosity of the epoxy resin composition was measured as follows 7 days and 14 days after the preparation of the composition. The viscosity measured at a point in time when the curing reaction of the epoxy resin composition is about to start is described as "viscosity at the start of curing reaction". The temperature measured at a point in time when the curing reaction of the epoxy resin composition is about to start is described as "temperature at the start of curing reaction".

The plate of a rheometer (manufactured by Thermo Fisher Scientific, HAAKE-MARS40) was preheated to 25° C. and kept as it was until the temperature became stable. After the temperature was found to be stable, the epoxy resin composition was isolated into a plate, the gap was adjusted, and then the measurement was started under the following condition.

Measurement mode: constant stress,
Level of stress: 300 Pa,
Frequency: 1.59 Hz,
Plate diameter: 25 mm,
Plate type: parallel plate,
Plate gap: 0.5 mm,
Heating rate: the epoxy resin composition was heated at 2° C./min from 25° C. to a temperature at which the curing reaction of the composition was about to start (that is, a temperature at which the viscosity was rapidly increased).

The viscosity measured under heating condition is a measure of fluidity of a matrix resin which is in other words the epoxy resin composition during the press molding of SMC, and a measure of amounts of burrs that is formed during the press molding.

The temperature at the start of curing reaction was evaluated based on the following evaluation standards. When a sample was graded "A", it was determined that the matrix resin had favorable fluidity, and the amount of burrs formed during the press molding is small.

A (favorable): the temperature at the start of curing reaction of the epoxy resin composition measured after 7 days and 14 days is 70° C. to 115° C.

B (defective): the temperature at the start of curing reaction of the epoxy resin composition measured after 7 days and 14 days is lower than 70° C. or higher than 115° C.

(Measurement of Gel Time)

Immediately after being prepared, the epoxy resin composition was put and sealed into an airtightable container, and left to stand in a room at 23° C. for 7 days in a place protected from direct sunlight. Cover glass (manufactured by Matsunami Glass Ind., Ltd.) having a thickness of 0.13 to 0.17 mm was left for 120 seconds on a hot plate preheated to 140° C. Then, the epoxy resin composition kept for 7 days after being prepared was placed on the cover glass, another cover glass was placed thereon so that the epoxy resin composition was interposed between the cover glasses, and the measurement of time was started immediately after the composition was interposed between the cover glasses. The upper cover glass was moved using tweezers, and the time taken for the cover glass to stop moving was measured and adopted as a gel time of the epoxy resin composition at 140° C.

The measured gel time is a measure of time taken for molding SMC. Furthermore, the gel time is a measure of the formation of burrs during the press molding of SMC.

A (favorable): the gel time is 50 to 85 seconds.
B (not bad): the gel time is 30 seconds or longer and shorter than 50 seconds, or longer than 85 seconds and 140 seconds or shorter.
C (defective): the gel time is shorter than 30 seconds or longer than 140 seconds.

(Manufacturing of SMC)

By using a doctor blade, a carrier film made of polyethylene was coated with the epoxy resin composition at a coating weight of 360 g/m². In this way, two sheets of films were prepared.

On the epoxy resin composition-coated surface of one of the films, chopped carbon fiber tows, which were obtained by cutting a carbon fiber tow constituted with 3,000 filaments (manufactured by Mitsubishi Chemical Corporation, TR50S 3L) in an average length of 25 mm, were scattered so that the basis weight of the carbon fiber was substantially uniform at 1,080 g/m² and the fiber direction of the carbon fiber was random. In this way, a sheet-like substance was obtained.

The epoxy resin composition-coated surface of the other film was bonded to the surface of the sheet-like substance prepared as above so that the chopped carbon fiber tows were interposed between the epoxy resin compositions. The obtained laminate was pressed by being passed between rolls so that the chopped carbon fiber tows were impregnated with the epoxy resin composition, thereby obtaining a SMC precursor.

The obtained SMC precursor was left to stand at room temperature for 7 days so that the epoxy resin composition in the SMC precursor was sufficiently thickened, thereby obtaining 280 mm (length)×280 mm (width) SMC containing an epoxy resin composition and reinforcing fiber.

<Manufacturing of Fiber-Reinforced Composite>

SMC was laminated in 2 ply, thereby obtaining a laminate. A 300 mm (length)×300 mm (width)×2 mm (thickness) molding die was charged with the laminate at a charge ratio of 65% (ratio of the area of SMC to the area of the die), and SMC was heated and compressed for 5 minutes under the condition of a die temperature of 140° C. and a pressure of 4 MPa so that the epoxy resin composition was cured, thereby obtaining a 30 mm×30 mm flat plate-like fiber-reinforced composite having a thickness of about 2 mm (CFRP molding plate).

The obtained fiber-reinforced composite was measured and evaluated as follows. The results are shown in Tables 1 to 3.

(Evaluation of Formation of Burrs)

A burr formation rate during the manufacturing of the fiber-reinforced composite was calculated from the following Equation (I).

$$\text{Burr formation rate} = (X-Y)/(X) \times 100 \qquad (I)$$

(In Equation (I), X represents the mass of SMC with which the molding die was charged, and Y represents the mass of the molded product (fiber-reinforced composite) taken out of the molding die after molding.)

When the number of burrs formed in a molding die is small, the burrs can be removed within a short period of time after molding. Accordingly, the molding cycle can be shortened.

The formation of burrs was evaluated based on the following evaluation standards.
A (favorable): the burr formation rate is lower than 6%.
B (defective): the burr formation rate is 6% or higher.

(Mechanical Characteristic Evaluation 1: 3-Point Bending Test)

Twelve sheets of test pieces having a width of 25 mm, a length of 100 mm, and a thickness of about 2 mm were cut out of the fiber-reinforced composite. By using an all-purpose tester (manufactured by Instron, INSTRON 5965), bending strength, flexural modulus, and bending elongation at break were measured based on JIS K 7017 under the following conditions, and the average of the 12 sheets was determined.

Crosshead speed; 1 mm/min,
Span length: set by actually measuring the thickness of the fiber-reinforced composite and multiplying the thickness by 16 (unit: mm).

(Mechanical Characteristic Evaluation 2: Tensile Test)

Six sheets of test pieces having a width of 25 mm, a length of 250 mm, and a thickness of about 2 mm were cut out of the fiber-reinforced composite. By using an all-purpose tester (manufactured by Instron, INSTRON 4482), tensile strength and tensile modulus were measured based on JIS K 7164 under the following conditions, and the average of the 6 sheets was determined.

Span length: 150 mm,
Strain gauge: KFGS-20-120-C1-11L1M2R,
Gauge length: 20 mm,
Data recording device: KYOWA EDX100A,
Crosshead speed; 2 mm/min.

(Heat Resistance Evaluation: Heat Resistance Test)

The fiber-reinforced composite was processed into a 55 mm (length)×12.5 mm (width) test piece and measured at a measurement frequency of 1 Hz and a heating rate of 5° C./min by using a rheometer (TA Instrument, Inc., ARFS-RDA). The temperature at which a peak occurs in a temperature-tan δ curve was defined as a glass transition temperature, and the heat resistance was evaluated based on the following evaluation standards.

A (favorable): the glass transition temperature is 140° C. or higher.
B (defective): the glass transition temperature is lower than 140° C.

TABLE 1

|  |  |  | Example 1 | Example 2 | Example 3 | Example 4 | Example 5 |
|---|---|---|---|---|---|---|---|
| Component (A) [part by mass] | jER828 | | 95 | 95 | 95 | 95 | 95 |
|  | TETRAD-X | | 5 | 5 | 5 | 5 | 5 |
| Component (B) [part by mass] | HN-2200 | | 12.5 | 12.5 | 12.5 | 12.5 | 12.5 |
| Component (C) [part by mass] | PN-23J | | 5 | 5 | 5 | 4 | 0 |
|  | PN-31J | | 0 | 0 | 0 | 0 | 5 |
|  | P-0505 | | 0 | 0 | 0 | 0 | 0 |
| Component (D) [part by mass] | 2MZA-PW | | 3 | 5 | 4 | 4 | 3 |
|  | DICYANEX1400F | | 0 | 0 | 0 | 0 | 0 |
| Other components [part by mass] | L-070E | | 0 | 0 | 0 | 0 | 0 |
| Isothermal viscosity | After 30 minutes | Viscosity at 25° C. [Pa · s] | 5 | 6 | 5 | 5 | 5 |
|  | After 7 days | Viscosity at 25° C. (b1) [Pa · s] | 21,620 | 21,820 | 7,008 | 12,160 | 20,600 |
|  | After 14 days | Viscosity at 25° C. (b2) [Pa · s] | 12,910 | 25,070 | 11,890 | 41,080 | 40,030 |
|  |  | b2/b1 | 0.6 | 1.1 | 1.7 | 3.4 | 1.9 |

TABLE 1-continued

|  |  |  | Example 1 | Example 2 | Example 3 | Example 4 | Example 5 |
|---|---|---|---|---|---|---|---|
| Viscosity under heating condition | After 7 days | Viscosity at the start of curing reaction [Pa · s] | 1 | 1.2 | 0.7 | 0.9 | 0.7 |
|  |  | Temperature at the start of curing reaction [° C.] | 99 | 99 | 99 | 102 | 104 |
|  | After 14 days | Viscosity at the start of curing reaction [Pa · s] | 1.3 | 1.8 | 1.1 | 1.5 | 1.1 |
|  |  | Temperature at the start of curing reaction [° C.] | 99 | 98 | 97 | 100 | 103 |
|  | Evaluation of viscosity under heating condition |  | A | A | A | A | A |
| Gel time | Gel time [sec] |  | 75 | 70 | 80 | 90 | 75 |
|  | Evaluation of gel time |  | A | A | A | B | A |
| Molding characteristics | Burr formation rate [%] |  | 3.3 | 2.1 | 2.4 | 2.8 | 3.0 |
|  | Evaluation of burr formation |  | A | A | A | A | A |
| Mechanical characteristics | 3-Point bending test | Bending strength [MPa] | 457 | 421 | 528 | 449 | 446 |
|  |  | Flexural modulus [GPa] | 28 | 27 | 33 | 29 | 28 |
|  |  | Bending elongation at break [%] | 1.9 | 1.8 | 1.8 | 1.8 | 1.9 |
|  | Tensile test | tensile strength [MPa] | 255 | 276 | 265 | 265 | 272 |
|  |  | tensile modulus [GPa] | 32 | 32 | 33 | 37 | 35 |
| Heat resistance | Heat resistance test | Glass transition temperature [° C.] | 150 | 158 | 152 | 157 | 155 |

TABLE 2

|  |  | Example 6 | Example 7 | Example 8 | Example 9 | Comparative Example 1 |
|---|---|---|---|---|---|---|
| Component (A) [part by mass] | jER828 | 95 | 95 | 95 | 95 | 95 |
|  | jER807 | 0 | 0 | 0 | 0 | 0 |
|  | jER827 | 0 | 0 | 0 | 0 | 0 |
|  | TETRAD-X | 5 | 5 | 5 | 5 | 5 |
| Component (B) [part by mass] | HN-2200 | 12.5 | 12.5 | 12.5 | 12.5 | 12.5 |
| Component (C) [part by mass] | PN-23J | 0 | 0 | 0 | 0 | 0 |
|  | PN-31J | 5 | 4 | 0 | 0 | 0 |
|  | P-0505 | 0 | 0 | 5 | 8 | 0 |
| Component (D) [part by mass] | 2MZA-PW | 5 | 4 | 3 | 0 | 5 |
|  | DICYANEX1400F | 0 | 0 | 0 | 0 | 1 |
| Other components [part by mass] | L-070E | 0 | 0 | 0 | 1 | 0 |
|  | Carbon black | 0 | 0 | 0 | 0 | 0 |
| Isothermal viscosity | After 30 minutes | Viscosity at 25° C. [Pa · s] | 6 | 5 | 5 | 3 | 5 |
|  | After 7 days | Viscosity at 25° C. (b1) [Pa · s] | 15,500 | 15,510 | 41,230 | 10,380 | 25,210 |
|  | After 14 days | Viscosity at 25° C. (b2) [Pa · s] | 49,850 | 57,440 | 60,280 | 15,930 | 20,500 |
|  |  | b2/b1 | 3.2 | 3.7 | 1.5 | 1.5 | 0.8 |
| Viscosity under heating condition | After 7 days | Viscosity at the start of curing reaction [Pa · s] | 0.8 | 0.7 | 1.9 | 2 | 0.3 |
|  |  | Temperature at the start of curing reaction [° C.] | 104 | 104 | 95 | 97 | 117 |
|  | After 14 days | Viscosity at the start of curing reaction [Pa · s] | 1.4 | 1.3 | 3.6 | 2.5 | 0.4 |

TABLE 2-continued

|  |  |  | Example 6 | Example 7 | Example 8 | Example 9 | Comparative Example 1 |
|---|---|---|---|---|---|---|---|
|  |  | Temperature at the start of curing reaction [° C.] | 102 | 104 | 95 | 92 | 116 |
|  |  | Evaluation of viscosity under heating condition | A | A | A | A | B |
| Gel time |  | Gel time [sec] | 70 | 85 | 50 | 45 | 145 |
|  |  | Evaluation of gel time | A | A | A | B | C |
| Molding characteristics |  | Burr formation rate [%] | 2.3 | 2.7 | 3.5 | 5.2 | 6.2 |
|  |  | Evaluation of burr formation | A | A | A | A | B |
| Mechanical characteristics | 3-Point bending test | Bending strength [MPa] | 507 | 500 | 478 | 517 | 585 |
|  |  | Flexural modulus [GPa] | 30 | 31 | 30 | 31 | 32 |
|  |  | Bending elongation at break [%] | 1.9 | 1.8 | 2.1 | 1.8 | 1.9 |
|  | Tensile test | tensile strength [MPa] | 261 | 267 | 258 | 271 | 275 |
|  |  | tensile modulus [GPa] | 36 | 33 | 35 | 37 | 38 |
| Heat resistance | Heat resistance test | Glass transition temperature [° C.] | 156 | 156 | 160 | 153 | 157 |

TABLE 3

|  |  |  | Example 10 | Example 11 | Example 12 | Example 13 |
|---|---|---|---|---|---|---|
| Component (A) [part by mass] |  | jER828 | 0 | 0 | 0 | 0 |
|  |  | jER807 | 97 | 0 | 93 | 97 |
|  |  | jER827 | 0 | 95 | 0 | 0 |
|  |  | TETRAD-X | 3 | 5 | 7 | 3 |
| Component (B) [part by mass] |  | HN-2200 | 14 | 11 | 12 | 13 |
| Component (C) [part by mass] |  | PN-23J | 4 | 4 | 4 | 4 |
|  |  | PN-31J | 0 | 0 | 0 | 0 |
|  |  | P-0505 | 0 | 0 | 0 | 0 |
| Component (D) [part by mass] |  | 2MZA-PW | 4 | 4 | 4 | 4 |
|  |  | DICYANEX1400F | 0 | 0 | 0 | 0 |
| Other components [part by mass] |  | L-070E | 0 | 0 | 0 | 0 |
|  |  | Carbon black | 0 | 0.15 | 0 | 0 |
| Isothermal viscosity | After 30 minutes | Viscosity at 25° C. [Pa · s] | 4 | 7 | 4 | 5 |
|  | After 7 days | Viscosity at 25° C. (b1) [Pa · s] | 3,240 | 5,250 | 1,090 | 1,670 |
|  | After 14 days | Viscosity at 25° C. (b2) [Pa · s] | 3,300 | 6,150 | 2,040 | 1,830 |
|  |  | b2/b1 | 1.0 | 1.2 | 1.9 | 1.1 |
| Viscosity under heating condition | After 7 days | Viscosity at the start of curing reaction [Pa · s] | 0.8 | 0.5 | 0.5 | 0.7 |
|  |  | Temperature at the start of curing reaction [° C.] | 101 | 100 | 100 | 101 |
|  | After 14 days | Viscosity at the start of curing reaction [Pa · s] | 0.9 | 0.7 | 0.7 | 0.8 |
|  |  | Temperature at the start of curing reaction [° C.] | 98 | 99 | 99 | 98 |
|  |  | Evaluation of viscosity under heating condition | A | A | A | A |
| Gel time |  | Gel time [sec] | 55 | 95 | 55 | 50 |
|  |  | Evaluation of gel time | A | B | A | A |
| Molding characteristics |  | Burr formation rate [%] | 1.8 | 3.3 | 2.2 | 2.0 |
|  |  | Evaluation of burr formation. | A | A | A | A |
| Mechanical characteristics | 3-Point bending test | Bending strength [MPa] | 509 | 505 | 441 | 749 |
|  |  | Flexural modulus [GPa] | 33 | 40 | 35 | 38 |
|  |  | Bending elongation at break [%] | 1.8 | 1.4 | 1.5 | 1.5 |
|  | Tensile test | tensile strength [MPa] | 371 | 360 | — | — |
|  |  | tensile modulus [GPa] | 35 | 38 | — | — |
| Heat resistance | Heat resistance test | Glass transition temperature [° C.] | 156 | 166 | 160 | 157 |

The epoxy resin compositions used in Examples 1 to 13 are appropriately B-staged 7 days after the preparation of the compositions, and exhibited appropriate tackiness and draping properties when the compositions were made into SMC. In addition, the tackiness and draping properties of the compositions exhibited 14 days after the preparation of the compositions were not much different from those exhibited 7 days after the preparation of the compositions. Furthermore, the fluidity of the matrix resin during the press molding of SMC was equivalent to the fluidity of the compositions. As is evident from the results of the measurement of viscosity under heating condition, the fluidity is stable.

In SMC obtained in Examples 1 to 13, the gel time of the epoxy resin composition was 30 to 140 seconds, and the matrix resin exhibited favorable quick curing properties. Therefore, in manufacturing a fiber-reinforced composite, SMC could be molded within a short period of time.

Furthermore, few burrs were formed in press-molded products (fiber-reinforced composite) of SMC obtained in Examples 1 to 13, which showed that SMC obtained in Examples 1 to 13 has high productivity. As is evident from the results of the measurement of gel time, the quick curing properties and the productivity are excellent.

From SMC obtained in Examples 1 to 13, fiber-reinforced composite excellent in mechanical characteristics and heat resistance were obtained.

The tackiness and draping properties of Comparative Example 1 and the handleability thereof resulting from the temporal change of the tackiness and draping properties were substantially the same as those of examples. However, in Comparative Example 1, large amounts of burrs formed during the molding of SMC.

The gel time and the temperature at the start of curing reaction of the epoxy resin composition in Comparative Example 1 were significantly different from those in Examples 1 to 13, which showed that the curing properties of the epoxy resin composition are correlated with the amount of formed burrs. As is evident from the results of examples and comparative examples, by appropriately controlling the curing properties of the epoxy resin composition, that is, by controlling the gel time and a temperature at the start of curing reaction of the epoxy resin composition, the molding properties of SMC could be changed.

INDUSTRIAL APPLICABILITY

The sheet molding compound of the present invention inhibits the formation of burrs during press molding. Furthermore, the epoxy resin composition used for manufacturing the sheet molding compound is a material which has excellent reinforcing fiber impregnation properties, exhibits excellent tackiness and draping properties after B-staging, has excellent B-stage stability (fluidity during press molding), exhibits excellent quick curing properties during heating (stays in a die for a short period of time during press molding), and produces a press-molded product excellent in heat resistance, and has extremely high productivity. Furthermore, owing to its excellent mechanical characteristics and heat resistance after curing, the sheet molding compound of the present invention is suitable as a raw material of structural parts for industries and automobiles.

The invention claimed is:

1. A method of producing a sheet molding compound, the method comprising:
   impregnating reinforcing fiber with an epoxy resin composition;
   wherein:
   the epoxy resin composition comprises:
      component (A): an epoxy resin that is in a liquid state at 25° C.;
      component (B): an acid anhydride that is in a liquid state at 25° C. in an amount of 1 to 30% by mass with respect to a total mass of epoxy resins in the epoxy resin composition;
      component (C): a curing agent having a melting point of 40° C. or higher and lower than 180° C. in an amount of 1 to 10% by mass with respect to the total mass of epoxy resins in the epoxy resin composition; and
      component (D): a curing agent having a melting point of 180° C. to 300° C. in an amount of 0.1 to 10% by mass with respect to the total mass of epoxy resins in the epoxy resin composition; and
   component (A) comprises a glycidylamine-based epoxy resin in an amount of 1% to 30% by mass with respect to a total mass of component (A).

2. The method according to claim 1, the method further comprising thickening the epoxy resin composition after impregnating the reinforcing fiber with the epoxy resin composition.

3. The method according to claim 1, wherein:
   a viscosity of the epoxy resin composition measured by viscometry (a) at 30° C. 30 minutes after preparing the epoxy resin composition is 0.5 to 15 Pa·s;
   viscometry (a) comprises sealing the epoxy resin composition in an airtight container immediately after preparation, allowing the sealed epoxy resin composition to stand for 30 minutes at 23° C., and measuring the viscosity of the epoxy resin composition at 30° C.

4. The method according to claim 1, wherein the reinforcing fiber comprises carbon fiber.

5. The method according to claim 1, wherein component (B) contains 0.1 to 0.5 equivalents of acid anhydride groups with respect to 1 equivalent of epoxy groups contained in the epoxy resin composition.

6. The method according to claim 1, wherein component (C) comprises a curing agent having a melting point of 40° C. or higher and 120° C. or lower.

7. The method according to claim 1, wherein component (C) comprises a curing agent having a melting point of 40° C. or higher and lower than 69° C.

8. The method according to claim 1, wherein component (D) comprises at least one compound selected from the group consisting of a dicyandiamide and an imidazole-based compound.

9. A method of producing a fiber-reinforced composite, comprising:
   producing a sheet molding compound by the method according to claim 1; and
   press-molding the sheet molding compound.

* * * * *